United States Patent

Wolff et al.

[11] Patent Number: 5,116,886
[45] Date of Patent: May 26, 1992

[54] METHOD FOR THE PRODUCTION OF FILLERS MODIFIED WITH ORGANOSILICON COMPOUNDS, THE FILLERS PRODUCED IN THIS MANNER AND THEIR USE

[75] Inventors: Siegfried Wolff, Bornheim-Merten; Udo Gorl, Meckenheim; Hans Deusser, Karlstein, all of Fed. Rep. of Germany

[73] Assignee: Degussa AG, Fed. Rep. of Germany

[21] Appl. No.: 655,780

[22] Filed: Feb. 15, 1991

[30] Foreign Application Priority Data

Feb. 16, 1990 [DE] Fed. Rep. of Germany ....... 4004781

[51] Int. Cl.⁵ .................... C08K 9/06; C08K 9/00; C04B 14/04
[52] U.S. Cl. .................... 523/209; 523/213; 106/490
[58] Field of Search ........ 523/209, 212, 213; 106/426, 435, 437, 490

[56] References Cited

U.S. PATENT DOCUMENTS 4,143,027 3/1979 Sollman et al. ............ 106/490

4,704,414 11/1987 Kerner et al. .............. 160/490

FOREIGN PATENT DOCUMENTS 1-137518 5/1989 Japan ...................... 523/212

*Primary Examiner*—Paul R. Michl
*Assistant Examiner*—Peter Szekely
*Attorney, Agent, or Firm*—Cushman, Darby & Cushman

[57] ABSTRACT

A two-stage method for the surface modification of natural or synthetic, oxide or silicate fillers using organosilicon compounds of the formulas:

$$[R_n^1(RO)_{3-n}Si-(Alk)_m-(Ar)_p]_2[S]_x$$

or $$[R_n^1(RO)_{3-n}Si-(Alk)_m-(Ar)_p]SCN$$

in which filler and compound are intensively mixed without the addition of further solvents and the homogenized mixture is subjected in a preheated mixer to the hydrophobing reaction.

2 Claims, No Drawings

METHOD FOR THE PRODUCTION OF FILLERS MODIFIED WITH ORGANOSILICON COMPOUNDS, THE FILLERS PRODUCED IN THIS MANNER AND THEIR USE

The present invention relates to a method for the production of natural or synthetic, oxide or silicate fillers and pigments which are stable in storage and modified with organosilicon compounds, to the fillers modified in this manner and to their use in vulcanizable rubber mixtures.

BACKGROUND OF THE INVENTION

It is known that oxide surfaces can be treated with organosilicon compounds in order to improve the bond between the oxide filler and organic polymers with various chemical compositions and thereby to improve the reinforcing properties of the fillers in the polymers.

To this end, for example, the organosilicon compound in question can be dissolved in an organic solvent and e.g. then used to treat clays (U.S. Pat. No. 3,227,675 —Huber).

U.S. Pat. No. 3,567,680 teaches the modification of kaolines suspended in water with mercapto and amino silanes. However, those organosilicon compounds are water-soluble in the amounts necessary for the modification, so that, even in this instance, the treatment of the filler uses a solution.

U.S. Pat. No. 4,151,154 relates to silicate fillers whose surface is exposed to a treatment with two types of organosilicon compounds.

The oxide particles are treated in such a manner that they exhibit a rather strong affinity for water and to improve the ease of distributing them in aqueous systems.

U.S. Pat. No. 4,076,550 teaches the use of sulfur-containing organosilicon compounds in vulcanizable rubber mixtures.

These compounds can also be used in mixtures with silicas which, however, are not pretreated thermally and exhibit only a limited storage stability.

EP-PS 0 126 871 describes a method in which the surfaces of silicate fillers are modified with the aid of an aqueous emulsion of organosilicon compounds which are insoluble in water.

U.S. Pat. No. 4,141,751 is concerned with a method which does not require a solvent but is not practicable for certain organosilicon compounds, as experience demonstrates.

SUMMARY OF THE INVENTION

The present invention provides a method for the surface-modification of natural or synthetic, oxide or silicate fillers using one or more organosilicon compounds of the formula I:

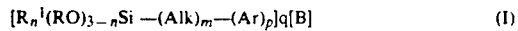

$$[R_n^1(RO)_{3-n}Si-(Alk)_m-(Ar)_p]_q[B] \quad (I)$$

in which:

B represents —SCN (if q=1) or —S$_x$—(if q=2)

R$^1$ signifies an alkyl group with 1 to 4 carbon atoms or the phenyl group,

R signifies an alkyl group with 1 to 4 carbon atoms or the phenyl group or C$_1$-C$_4$ alkyl-C$_1$-C$_4$ alkoxy group, n represents 0, 1 or 2, Alk signifies a bivalent, straight or branched hydrocarbon group having 1 to 6 carbon atoms, m represents 0 or 1, Ar is an arylene group with 6 to 12 carbon atoms, p is 0 or 1 with the provision that p and m do not signify 0 simultaneously and x is a number from 2 to 8.

The method is as follows:

a) At least one organosilicon compound according to Formula I is intensively mixed with the filler at temperatures below 60° C. in a concentration of $1 \times 10^{-7}$ to $3.5 \times 10^{-6}$ moles trialkoxysilyl groups per one square meter filler surface and without the addition of further solvents.

b) The homogenized mixture is subsequently subjected to the hydrophobing reaction in a preheated mixer, in a tempering bed or another suitable heatable reaction vessel at a temperature of 60° C. to 160° C., preferably 80° to 140° C. The dwell time in the reaction vessel is generally 3 min. to 2.4 hours.

The intensive mixer is e.g. a plowshare mixer whose speed is regulated so that intensive mixing occurs but, at the same time, the structure e.g. of the fine silicas is not destroyed and the temperature remains below 60° C. In general, this temperature is between 20° and <60° C. whereas the preheating temperature is at least 60° C.

The natural and synthetic fillers to be modified in accordance with the present invention, or mixtures of two or more of these fillers, are themselves known in rubber technology. An essential precondition for their suitability is the presence of —OH groups on the surface which can react with the alkoxy groups of the organosilicon compounds. They are oxide and silicate compounds which are compatible with rubbers and exhibit the fineness necessary for this application.

Among the natural silicates, kaolines or clays are especially suitable. However, kieselguhr or diatomaceous earths can also be used.

Aluminum oxide, aluminum hydroxide or aluminum trihydrate and titanium dioxide, which can be obtained from natural deposits, can be named by way of example as oxide fillers.

Especially suitable synthetic fillers are aluminum silicates, silicates, precipitated and pyrogenic silicas with BET surfaces (measured with gaseous nitrogen) from 1 to 1000 m$^2$/g, especially up to 300 m$^2$/g.

The fillers modified in accordance with the invention contain up to $3.5 \times 10^{-6}$ moles trialkoxysilyl groups per square meter of filler surface, preferably $0.1 \times 10^{-6}$ to $3.5 \times 10^{-6}$ moles. They are especially suitable for use in vulcanizable and formable rubber mixtures produced according to the conventional methods of the rubber industry.

Suitable rubber types include rubbers and their mixtures which are capable of being cross-linked with sulfur and vulcanization accelerator(s) to elastomers. This includes in particular the halogen-free rubber types, preferably so-called diene elastomers. These rubber types include e.g. oil-extended, natural and synthetic rubbers such as natural rubbers, butadiene rubbers, isoprene rubbers, butadiene-styrene rubbers, butadiene-acrylonitrile rubbers, butyl rubbers, ter polymers from ethylene, propylene and non-conjugated dienes. Moreover, the following additional rubbers are possible for rubber mixtures with the rubbers mentioned above: Carboxyl rubbers, epoxide rubbers, transpolypentenamers, halogenated butyl rubbers, chloroprene rubbers, ethylene-vinyl acetate copolymers, ethylene-propylene copolymers, optionally also chemical derivatives of natural rubber, as well as modified natural rubbers.

Naturally, the total amount of the filler required for the vulcanizable rubber formulation must be observed. This means that either the total amount of the filler to be added or part of its can modified in accordance with the present invention. In the latter instance, the part of the filler required for the formulation which has not been modified in accordance with the invention must be supplied in non-modified form.

The fillers modified in accordance with the invention have the advantage of high storage stability compared to pure mixtures e.g. of bis-(3-triethoxysilylpropyl)-tetrasulfane with silica such as those known from U.S. Pat. No. 4,076,550.

Compared to the in-situ method for treating fillers, used for years in the rubber industry (direct addition of silane to carbon black and/or to rubber mixtures filled with silicates), fillers treated in accordance with the invention have the advantage of low water content, of higher damped density as compared to untreated filler, simplified storage and, in addition, better processing behavior for the user in the rubber-processing industry (homogeneous production of mixture, savings of mixing stages and mixing time).

The fillers modified in accordance with the invention can not be produced according to the method described in U.S. Pat. No. 4,141,751.

It a bis-(3-trialkoxysilylpropyl)-tetrasulfane is mixed with a filler, and, if sufficient energy is supplied by intensive agitation of the mixture to cause the hydrophobing reaction to take place, an agglomerated product is obtained. However, a fine, flowable product such as that produced in accordance with the present invention would be desirable.

Determinations of methoxy groups (F. Fiebock and A. Schwabach, Chem. Ber. 63, (1930) 2818) were carried out on the modified fillers produced in accordance with the invention.

After the total hydrophobing of precipitated silica of the type ULTRASIL®VN 2 (125 m$^2$/g) or ULTRASIL®VN 3 (175 m$^2$/g) with $1.75 \times 10^{-6}$ moles Si 167/m$^2$ relative to the silica, the following values result for the number of free methoxy groups still present (from six originally present per molecule):

|  | method of the invention |
|---|---|
| VN 2/Si 167 | 1.7 |
| VN 3/Si 167 | 2.5 |

The modified fillers produced in accordance with the invention are stable in storage and result in vulcanized rubber mixtures which have a distinct improvement of properties, in comparison to vulcanized rubber mixtures which do not contain the modified fillers.

The storage stability of the modified fillers can be demonstrated by determination of the polysulfide content after a storage period of 12 months at 50° C. (Table 5), which varies only slightly within the limits of experimental error.

By contrast, the reaction of mercaptosilane and silicate filler according to U.S. Pat. No. 4,141,751 carried out at the same time results, provides product which have sharp variations in the total sulfur content (Table 4), which indicates insufficient storage stability.

The method of the invention can be carried out both discontinuously as well as continuously. The products obtained exhibit the same properties in each instance.

DETAILED DESCRIPTION OF PREFERRED EMBODIMENTS

The following examples illustrate the method of producing the fillers of the invention and provide information on the advantageous properties of the vulcanizates obtained using the modified fillers produced in accordance with the invention.

The polysulfide organosilicon compound used and the other compounds used are the following products:

Polysulfidic organosilicon compounds:

Si     167 = bis(3-trimethoxysilylpropyl)-tetrasulfane (Degussa)

Perbunan® NS 3307: nitrile-butadiene rubber (NBR)

Buna® Huls: styrene-butadiene rubber (SBR)

SMR 5: standard Malaysian rubber (natural rubber)

CORAX® N 220: carbon black, surface (BET) 120 m$^2$/g (Degussa)

Ultrasil® VN 3: precipitated silica with a surface of 175 m$^2$/g (Degussa)

Naftolen® ZD: softener of hydrocarbons

Vulkanox® 4010 NA: N-isopropyl-N'-phenyl-p-phenylene diamine

Vulkanox® HS: poly-2,2,4-trimethyl-1,2-dihydroquinoline

Protektor® G35: antiozonant wax

Vulkacit® MOZ: N-morpholine-2-benzothiazole sulfenamide

Vulkacit® mercapto: 2-mercaptobenzothiazole

Vulkacit® thiuram: tetramethyl-thiuram monosulfide

Vulkacit® CZ: N-cyclohexyl-2-benzothiazole sulfenamide

PEG 4000: polyethylene glycol

MBTS: 2,2'-dibenzothiazyldisulfide

TMTD: tetramethylthiuram disulfide

KP 140: aliphatic softeners

Test norms:

The physical tests were carried out at room temperature in accordance with the following mandatory standards:

|  |  | measured in |
|---|---|---|
| Tensile strength, | DIN 53 504 | MPa. |
| Breaking elongation and tensile modulus resistance to further tearing | DIN 53 507 | N/mm |
| Shore-A-hardness | DIN 53 505 | — |
| Mooney test, ML 4 | DIN 53 524 | — |
| Goodrich flexometer (determination of the heat buildup, ΔT) | ASTM D 623-62 | °C. |
| Firestone ball rebound | AD 20245 |  |
| DIN attrition | DIN 53 516 | (mm$^3$) |
| Compression set B | ASTM D 395 |  |

The method of treating the filler:

EXAMPLE 1

4kg ULTRASIL® VN 3 (175 m$^2$/g surface) are introduced into a Henschel F.M. 40-liter mixing unit provided with a two-piece variant mixing tool with horn, with a baffle with temperature meter mounted in the cover, with ventilation and a hollow jacket for tempering by means of vapor or water.

1st stage: After the cover has been closed, the speed of the mixing tool is brought to 2,600 rpms. 506 g Si 167 are sprayed at room temperature (~20°-25° C.) onto the filler, the mixture is homogenized and it is subsequently removed from the mixer. The amount of silane corresponds to $3.2 \times 10^{-6}$ moles trialkoxysilyl groups/m$^2$ surface.

2nd stage: After the mixture has been heated to 120° C., the mixture from stage 1 is reintroduced into the mixer and the speed of the mixer is raised to 2,600 rpms. After a temperature of 140° C. has been attained (swell time 10 minutes), the mixing unit is turned off and emptied.

The following tables give the values determined for various vulcanizates using fillers produced in accordance with the invention (concentrations are in parts by weight).

EXAMPLE 2

1st stage: ULTRASIL® VN 2 (125 m$^2$/g, precipitated silica) is introduced via a differential metering balance with a capacity of 25 kg/hour into a continuous mixer. At the same time, the silane Si 167 is sprayed from a vessel via a piston membrane pump and an atomizer jet with a capacity of 2.25 kg/hour at room temperature onto the silica in the mixer. After intensive mixing, the moistened material is discharged via a worm while maintaining a constant level in the mixer.

2nd stage: The silica/organosilane mixture discharged from the mixer is transported with a membrane pump into a heated reactor. The temperature in the reactor is 140° C. and the dwell time in the reactor is 2 hours. The time which exceeds approximately 10-20 min. is generally used to remove the alcohol eliminated during the reaction. The product located in the reactor is subsequently discharged via a bucket wheel lock while maintaining a constant level in the reactor.

An Ultrasil® VN2 is obtained which is modified with bis-(3-trimethoxysilylpropyl)-tetrasulfane, and which is stable in storage. It is transported by a membrane pump into a product silo from which it can subsequently be dispensed into paper bags.

TABLE 1

| Modified precipitated acid in natural rubber | | |
|---|---|---|
| SMR 5 ML (1 + 4) = 70-80 | 100 | 100 |
| Ultrasil VN3 | 40 | — |
| Si 167 modified Ultrasil VN3 (corresponds to 5.08 GT Si 167 per 100 GT VN3) | — | 45.08 |
| Si 167 | 5.08 | — |
| Zinc oxide RS | 4 | 4 |
| Stearic acid | 2 | 2 |
| Naftolen ZD | 2 | 2 |
| Protektor G 35 | 1.5 | 1.5 |
| Vulkanox HS | 1.5 | 1.5 |
| Vulkanox 4010 NA | 1.0 | 1.0 |
| Vulkacit MOZ | 2.82 | 2.82 |
| Sulfur | 2.86 | 2.86 |
| ML (1 + 4) at 100° C. | 83 | 84 |
| Vulcanization temperature: 145° C./t95 | | |
| Tear resistance (MPa) | 18.4 | 21.3 |
| Tensile modulus) 300% (MPa) | 13.2 | 13.8 |
| Breaking elongation (%) | 380 | 410 |
| Resistance to further tearing (N/mm) | 13 | 15 |
| Ball rebound (%) | 63.5 | 67.5 |
| Shore-A-hardness | 65 | 65 |
| DIN attrition (mm$^3$) | 146 | 119 |
| Flexometer (0.175"/108N/30"/RT) | | |
| ΔT Center (°C.) | 44 | 41 |

TABLE 1-continued

| Static compression (%) | 7.7 | 6.3 |
|---|---|---|
| Dynamic compression (%) | 7.3 | 5.6 |

TABLE 2

| Modified precipitated silica in SBR 1500 | | |
|---|---|---|
| Buna Huls 1500 | 100 | 100 |
| Ultrasil VN | 50 | — |
| Si 167 modified Ultrasil VN 2 (corresponds to 3 GT Si 167 per 100 GT VN 2) | — | 51.5 |
| Zinc oxide RS | 4 | 4 |
| Stearic acid | 2 | 2 |
| Vulkacit CZ | 2 | 2 |
| Sulfur | 2 | 2 |
| ML (1 + 4) at 100° C. | 84 | 86 |
| Vulcanization temperature: 150° C./t95 | | |
| Tear resistance (MPa) | 12.8 | 16.5 |
| Tensile modulus) 300% (MPa) | 2.6 | 5.1 |
| Breaking elongation (%) | 680 | 590 |
| Resistance to further tearing (N/mm) | 13 | 13 |
| Ball rebound (%) | 34 | 37 |
| Shore-A-hardness | 60 | 64 |
| DIN attrition (mm$^3$) | 192 | 147 |
| Compression set (22h/70° C.) | 20.2 | 14.7 |
| Goodrich Flexometer (0.175"/108N) | | |
| ΔT Center (°C.) | not measurable | 137 |
| Dynamic compression (%) | not measurable | 10 |

TABLE 3

| Modified precipitated silica in NBR | | |
|---|---|---|
| Perbunan NS 3307 | 100 | 100 |
| Ultrasil VN 3 | 50 | — |
| Si 167 modified Ultrasil VN 3 (corresponds to 12.8 GT Si 167 per 100 GT VN 3) | — | 56.4 |
| Zinc oxide RS | 5 | 5 |
| Stearic acid | 2 | 2 |
| Di-octylphthalate | 10 | 10 |
| KP 140 | 10 | 10 |
| PEG 4000 | 2.5 | 2.5 |
| MBTS | 1.2 | 1.2 |
| TMTD | 0.6 | 0.6 |
| Sulfur | 1.5 | 1.5 |
| ML (1 + 4) at 100° C. | 78 | 52 |
| Vulcanization temperature: 160° C./t95 | | |
| Tear resistance (MPa) | 15.1 | 13.7 |
| Tensile modulus) 200% (MPa) | 2.7 | 9.2 |
| Breaking elongation (%) | 630 | 270 |
| Resistance to further tearing (N/mm) | 12 | 6 |
| Firestone ball rebound (%) | 32.8 | 31.8 |
| Shore-A-hardness | 66 | 74 |
| DIN attrition (mm$^3$) | 139 | 65 |
| Compression set B | | |
| 22h/70° C. (%) | 20.5 | 10.9 |
| 70h/100° C. (%) | 51.7 | 32.7 |

Storage stability:

The following values were determined for evaluating the storage stability of the fillers modified with polysulfidic organosilicon compound(s):

The polysulfide sulfur content of fillers modified with polysulfidic organosilicon compound(s) in open storage at 50° C. for a period of 12 months.

They exhibit a constant content of polysulfide sulfur for the entire time (Table 5).

By comparison, a sharp variation of the sulfur values found occurs in the case of similar measurements with modified silicas obtained according to the method known from U.S. Pat. No. 4,141,751 using 3-mercaptopropyltrimethoxysilane (A 189). This indicates an insufficient storage stability of the product obtained. (Table 4)

The following applies:

1 GT Si 167/100 GT VN3 = 1.256 10⁻⁷ moles Si 167/m²
1 GT A 189/100 GT VN3 = 2.909 10⁻⁷ moles A 189/m²

TABLE 4

Chemical analysis -A189 modified Ultrasil VN3 open storage at 50° C.

| GT A189 100 GT VN3 | Total sulfur | | | |
|---|---|---|---|---|
| | Theoretically calculated % | starting material % | 6 months % | 12 months % |
| 1.1 | 0.151 | 0.165 | 0.100 | 0.213 |
| 2.2 | 0.323 | 0.336 | 0.521 | 0.530 |
| 3.3 | 0.493 | 0.550 | 0.731 | 0.664 |
| 3.8 | 0.576 | 0.639 | 0.739 | 0.742 |
| 4.4 | 0.659 | 0.747 | 1.234 | 1.205 |
| 5.5 | 0.822 | 0.918 | 1.393 | 1.102 |
| 8.2 | 1.219 | 1.373 | 1.858 | 1.783 |
| 10.9 P6659 | 1.599 | 1.864 | 2.419 | 2.051 |

TABLE 5

Chemical analysis-Si167 modified Ultrasil VN3 open storage at 50° C

| GT Si167 100 GT VN3 | Polysulfide sulfur | | | |
|---|---|---|---|---|
| | Theoretically calculated % | starting material % | 6 months % | 12 months % |
| 2.5 GT Si167 | 0.324 | 0.339 | 0.322 | 0.300 |
| 5.4 GT Si167 | 0.635 | 0.684 | 0.653 | 0.620 |
| 7.6 GT Si167 | 0.934 | 0.964 | 0.921 | 0.950 |
| 8.9 GT Si167 | 1.079 | 1.135 | 1.042 | 1.004 |
| 10.1 GT Si167 | 1.221 | 1.237 | 1.219 | 1.202 |
| 12.7 GT Si167 | 1.497 | 1.587 | 1.473 | 1.402 |

EXAMPLE 3

Silicas modified with 3-thiocyanatopropyltriethoxysilane (Se 264) are produced in accordance with Examples 1 and 2.

The following values are determined for the free ethoxy groups on the surface (per silane molecule):

TABLE 6

| GT Si 264 100 GT VN3 | Moles Si 264/m² | Ethoxy groups |
|---|---|---|
| 1.34 | 3 · 10⁻⁷ | 0.65 |
| 2.65 | 7 · 10⁻⁷ | 0.45 |
| 4.02 | 1 · 10⁻⁶ | 0.29 |
| 5.4 | 1.4 · 10⁻⁶ | 0.23 |
| 6.7 | 1.8 · 10⁻⁶ | 0.24 |

TABLE 7

| GT Si 264/100 GT VN2 | Moles Si 264/m² | Ethoxy groups |
|---|---|---|
| 1.34 | 5 · 10⁻⁷ | 0.49 |
| 2.65 | 1 × 10⁻⁶ | 0.29 |
| 4.02 | 1.5 × 10⁻⁶ | 0.24 |
| 5.4 | 2.0 × 10⁻⁶ | 0.26 |
| 6.7 | 2.5 · 10⁻⁶ | 0.30 |

TABLE 8

| Precipitated silica modified with Si264 in SBR 1500 | | | |
|---|---|---|---|
| Buna Huls 1500 | 100 | 100 | 100 |
| ZnO RS | 3 | 3 | 3 |
| Stearic acid | 2 | 2 | 2 |
| ULTRASIL VN 2 | 50 | — | — |
| Si264 mod. VN2 (4.02 GT Si264 per 100 GT VN2) | — | 50 | — |
| Si264 mod. VN2 (6.7 GT Si264 per 100 GT VN2) | — | — | 50 |
| Vulkacit CZ | 2 | 2 | 2 |
| Sulfur | 2 | 2 | 2 |
| Rheometer 150° C. | | | |
| $D_{max}-D_{min}$ (Nm) | 9.79 | 11.91 | 12.30 |
| $t_{10\%}$ (min) | 19.1 | 16.3 | 14.0 |
| $t_{90\%}$ (min) | 40.3 | 45.9 | 36.4 |
| $t_{90\%}-t_{10\%}$ (min) | 24.3 | 29.6 | 22.4 |
| Vulcanization temperature: 150° C./t95% | | | |
| Tear resistance (MPa) | 14.3 | 26.0 | 25.7 |
| Modulus 300 (MPa) | 3.8 | 7.3 | 8.5 |
| Breaking elongation (%) | 650 | 600 | 560 |
| Shore hardness | 66 | 76 | 76 |

What is claimed is:

1. A method for the surface-modification of natural or synthetic, oxide or silicate fillers having surface —OH groups using one or more organosilicon compounds of the Formula I:

$$[R_n^1(RO)_{3-n}Si—(Alk)_m—(Ar)_p]q \;[B] \qquad (I)$$

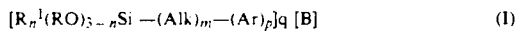

in which:

B represents —SCN (if q=1) or —$S_x$— (if q=2),

[R and] R¹[, which may be the same or different, signify] signifies an alkyl group with 1 to 4 carbon atoms or the phenyl group, R signifies an alkyl group with 1 to 4 carbon atoms or the phenyl group or a $C_1$-$C_4$ alkyl-$C_1$-$C_4$ alkoxy group, n represents 0, 1 and 2, Alk signifies a bivalent, straight or branched hydrocarbon group having 1 to 6 carbon atoms.

m represents 0 or 1,

Ar is an arylene group with 6 to 12 carbon atoms, p is 0 or 1 the provision that p and m do not signify 0 simultaneously, and x is a number from 2 to 8, said method comprising a) intensively mixing at least one organosilicon compound according to Formula I with the filler, but without the addition of further solvents, at a temperature below 60° C. in a concentration of up to 3.5×10⁻⁶ moles trialkoxysilyl groups per one square meter filler surface and b) subsequently subjecting the homogenized mixture to a hydrophobing reaction at temperature greater than 60° C.

2. A process as set forth in claim 1 in which said organosilicon compound is bis (3-trimethoxysilylpropyl)tetrasulfane.

* * * * *